Figure 1:
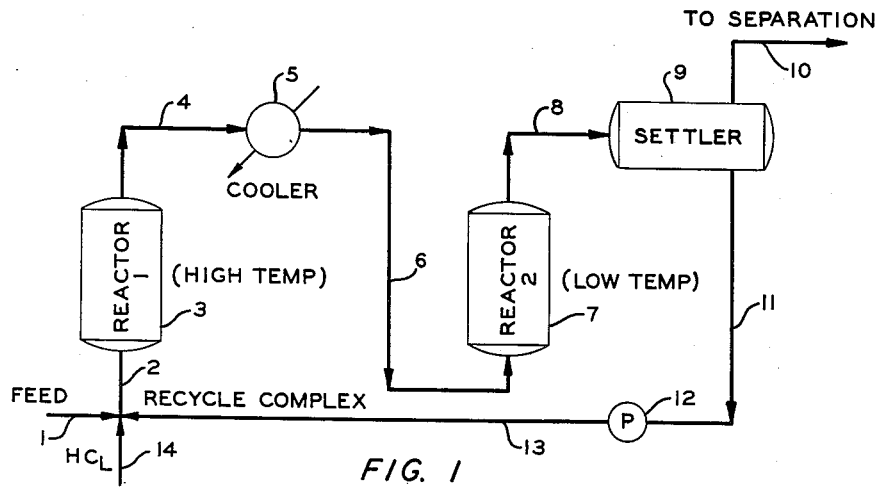

Sept. 18, 1962          J. T. CABBAGE          3,054,832

TWO-STAGE ISOMERIZATION OF METHYLCYCLOPENTANE AND NORMAL HEXANE

Filed Jan. 26, 1960          2 Sheets-Sheet 1

NOTE:
    A= EQUILIBRIUM $nC_6 \rightarrow iC_6$ AT 150°F
    B= EQUILIBRIUM MCP $\rightarrow$ $CyC_6$ AT 150°
    C= EQUILIBRIUM $nC_6 \rightarrow iC_6$ AT 100°F
    D= EQUILIBRIUM MCP $\rightarrow$ $CyC_6$ AT 100°F INVENTOR.
J. T. CABBAGE
BY
Hudson + Young
ATTORNEYS 3,054,832
TWO-STAGE ISOMERIZATION OF METHYL-
CYCLOPENTANE AND NORMAL HEXANE
John T. Cabbage, Bartlesville, Okla., assignor to Phillips Petroleum Company, a corporation of Delaware
Filed Jan. 26, 1960, Ser. No. 4,731
3 Claims. (Cl. 260—666)

This invention relates to a two-stage isomerization process for isomerizing methylcyclopentane and normal hexane to cyclohexane and isohexane, respectively. In one of its aspects, the invention, in a first stage, isomerizes at a relatively high temperature to accelerate the hexane to isohexane reaction and then, in a second stage, continues isomerization at a lower temperature to shift the equilibrium toward higher yields of isohexanes and cyclohexane. In another of its aspects, the invention relates to a two-stage isomerization of methylcyclopentane and normal hexane to cyclohexane and isohexane, respectively, in the presence of a catalyst wherein the first stage is conducted at a relatively high temperature and the second stage is conducted at a relatively lower temperature, each stage being conducted at optimum reaction times.

A concept of the present invention is based upon at least the following facts.

In the isomerization of mixed hexanes using hydrogen chloride-activated aluminum chloride catalyst there are two primary reactions of primary importance.

(1)

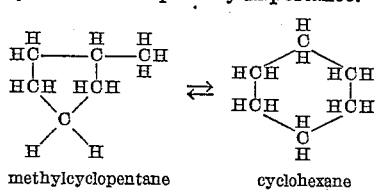

methylcyclopentane      cyclohexane and (2)

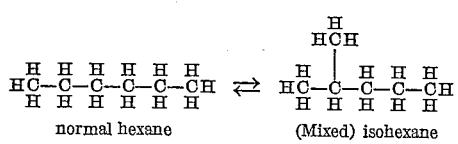

normal hexane      (Mixed) isohexane

These primary reactions are desirably effected in a single reaction system. Lower temperatures favor the equilibrium concentrations of both cyclohexane and isohexane, as shown below:

Table I

| Temp., °F. | Mol percent cyclohexane (cyclohexane in methylcyclopentane) | Mol percent isohexane (isohexane in normal hexane) |
|---|---|---|
| 50 | 90 | 99 |
| 100 | 84 | 98 |
| 150 | 76 | 97 |
| 200 | 65 | 96 |

In the temperature range shown in Table I, the reaction of methylcyclopentane→cyclohexane proceeds at a rapid rate, the equilibrium concentration of cyclohexane being reached in about 15 minutes of reaction time. However, the reaction rate for normal hexane→isohexane proceeds at a much slower rate, so that for a 15 minute reaction time at 50° F., for example, only about 3 to 5 percent isohexane in the normal hexane is realized. Higher temperatures, however, speed up the reaction rate so that at 150° F. and 15 minutes reaction time, the isohexane in normal hexane will be 40 to 50 percent, even though the equilibrium concentration is lower at 150° F., being 97 percent, compared with the equilibrium at 50° F. of 99 percent. It is seen that a relatively long reaction time would be required in order to attain the isohexane in normal hexane equilibrium. Such long reaction times, of course, are not practical for commercial operations.

Consequently in conventional operations using a single reaction zone to convert methylcyclopentane and accompanying hexane to obtain cyclohexane as the main product and isohexanes are the desirable by-products, temperatures are set at a low figure to increase cyclohexane production, and the reaction of normal hexane→isohexane proceeds as far as possible for the relatively short reaction time used, e.g., 45 minutes. This reaction time, at the low temperature, e.g., 100° F., results in not more than 10 mol percent of isohexane. The conversion of methylcyclopentane to cyclohexane under these conditions is about 84 mol percent.

It has occurred to me that, by using a plurality of reactors in series, great flexibility can be provided to take optimum advantage of each of the reactions here discussed at its respective rate and optimum temperature and time levels. Thus, I have conceived that a high temperature long residence time reactor will speed up the formation of isohexane from normal hexane, obtaining only a relatively low concentration (65-75 mol percent conversion) of cyclohexane in methylcyclopentane and then, in a second reactor at low temperature and of short residence time, the cyclohexane concentration can be considerably increased (to 75-90 percent).

It is an object of this invention to provide an improved isomerization process for the conversion of methylcylclopentane and hexane to cyclohexane and isohexane, respectively. It is another object of the invention in an isomerization operation to take advantage of the different rates of isomerization or conversion of methylcyclopentane and hexane to obtain increased yields of both in optimum time. It is a further object of the invention to provide a modus operandi for obtaining higher yields of cyclohexane and isohexane from methylcylopentane and hexane in a reasonable reaction time.

Other aspects, objects, and the several advantages of the invention are apparent from a study of this disclosure, the drawing and the appended claims.

According to the invention, a feed stream comprising methylcyclopentane and hexane is first isomerized at a relatively high temperature to convert the hexane to isohexane and then at a lower temperature for a shorter period of time to achieve near equilibrium concentration of cyclohexane in methylcyclopentane.

Thus, the invention takes advantage of the differences in reaction rates of methylcylopentane being isomerized to cyclohexane and normal hexane being isomerized to isohexane to increase isohexane production at a given cyclohexane production.

It will be noted that, at the higher temperature of my invention, the theoretical (equilibrium) concentration of isohexanes is less than at a lower temperature but, since equilibrium is not reached at reasonable times of reaction, the high temperature operation step of my invention produces a higher concentration of isohexanes in the same reaction time than is produced at the lower temperature reaction. The methylcyclopentane to cyclohexane reaction rate is faster at all temperatures contemplated by the invention than is the conversion of normal hexane to isohexane. There is obtained, however, some additional conversion of hexane to isohexanes in the second stage of the operation.

In one form of the invention, two separate and distinct zones are employed. In a first zone at a higher temperature, both reactions will proceed resulting in, e.g., a 60 to 80 percent approach to equilibrium for the normal hexane to isohexane reaction, and in an equilibrium concentration of cyclohexane in methylcyclopentane. In the second zone to which effluent from the first zone is charged, a lower temperature and shorter residence time are maintained and the cyclohexane concentration rapidly reaches desirable equilibrium conditions, all the while retaining the previously converted isohexanes, with the formation of an additional small quantity of isohexanes from normal hexane in the low temperature operation.

A particularly important advantage of the invention, among its several advantages, lies in the lowered catalyst carry-over or loss in the hydrocarbon product, as will be understood by one skilled in the art having studied this disclosure.

The embodiment of the invention here discussed increases the quantity of isohexanes produced for a given quantity of cyclohexane produced in a given reaction capacity. Thus, to obtain conventionally the results of the invention, the conventional reactor would necessarily have to be much larger to give a longer residence time.

The following are data which exemplify one set of conditions of operation of the claimed invention compared with conventional operation. The figures given assume no cyclohexane nor any isohexanes in the feeds. Reading the tabular data which now follow, it will be noted that the temperatures given for separate operations 1 and 2 are 100° F. and 150° F., respectively, whereas for the operation according to the invention the temperatures for reaction zones 1 and 2 are given, respectively, as 150° F. and 100° F. Thus, the temperatures have been interchanged, as it were.

Instead of having a uniform time of 45 minutes in each operation as given for the conventional modus operandi, the invention has, in zone 1, a 30-minute period and, in zone 2, a 15-minute period for a total of 45 minutes.

*Conventional:*
   Operation 1.—
      Temperature, ° F. _____ 100
      Reaction time, min. _____ 45
      Conversion to cyclohexane, mol percent,[1]__ 84
      Conversion to isohexane, mol percent,[1]___ 10
   Operation 2.—
      Temperature, ° F. _____ 150
      Reaction time, min. _____ 45
      Conversion to cyclohexane, mol percent,[1]__ 76
      Conversion to isohexane, mol percent,[1] ___ 76

*Invention:*
   Reaction zone 1.—
      Temperature, ° F. _____ 150
      Reaction time, min. _____ 30
      Conversion to cyclohexane, mol percent,[1]__ 76
      Conversion to isohexane, mol percent,[1]___ 70
   Reaction zone 2.—
      Temperature, ° F. _____ 100
      Reaction time, min. _____ 15
      Total final cyclohexane, mol percent,[1] ____ 84
      Total final isohexane, mol percent,[1]_____ 74

[1] Assuming no cyclohexane nor isohexane in the feed, and reported as mol percent conversion of the initial materials.

Thus, for the same 45 minute total reaction time in conventional 1 and the invention, each operation produces 84 mol percent cyclohexane, but that the invention produces 64 mol percent more of isohexane than conventional 1, i.e., 74 instead of only 10 mol percent.

Also, for the same 45 minute total reaction time in conventional 2 and the invention, the invention produces 8 mol percent more cyclohexane than conventional 2 at the expense of only 2 mol percent isohexane.

Thus, whether the conventional operation be conducted at 100 or at 150° F. for a period of 45 minutes, the yields do not nearly equal those of the invention. Also, the advantage of lower catalyst carry-over is not realized in the conventtional operation at 150° F. that is realized in the invention.

Figure 2:
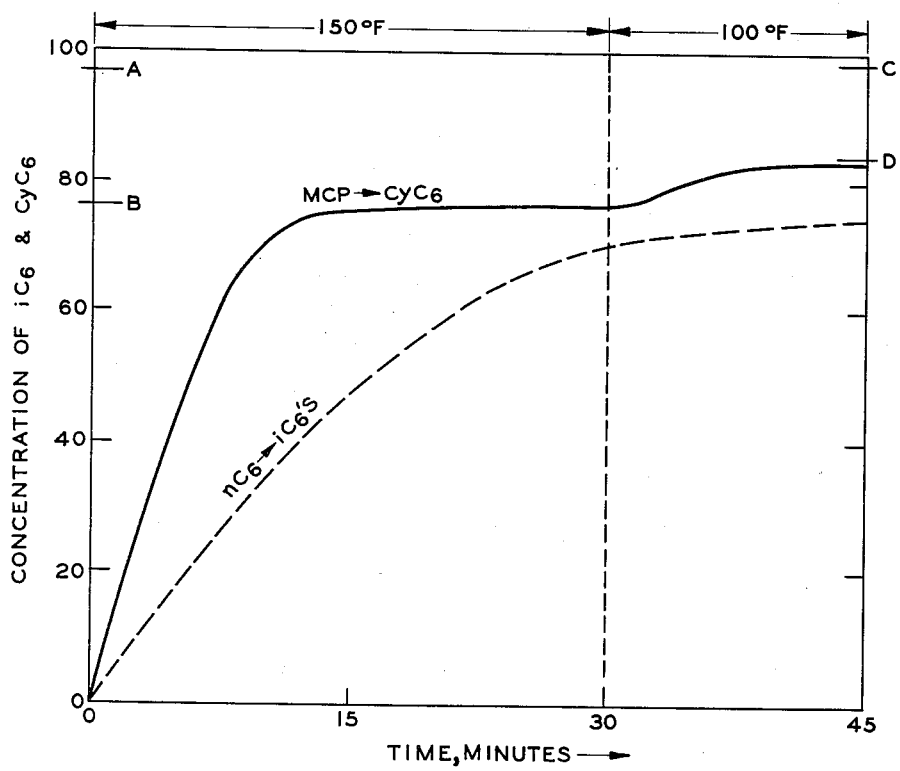
Figure 3:
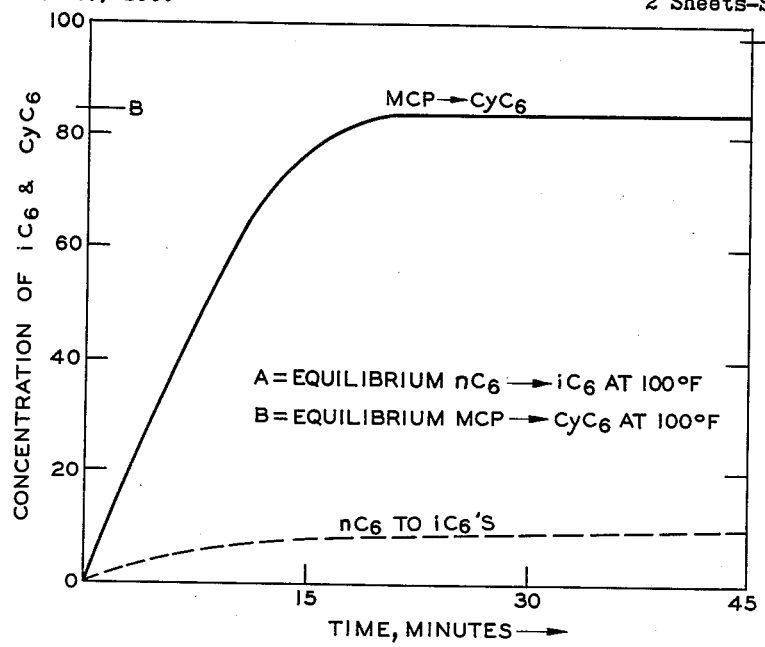
Figure 4:
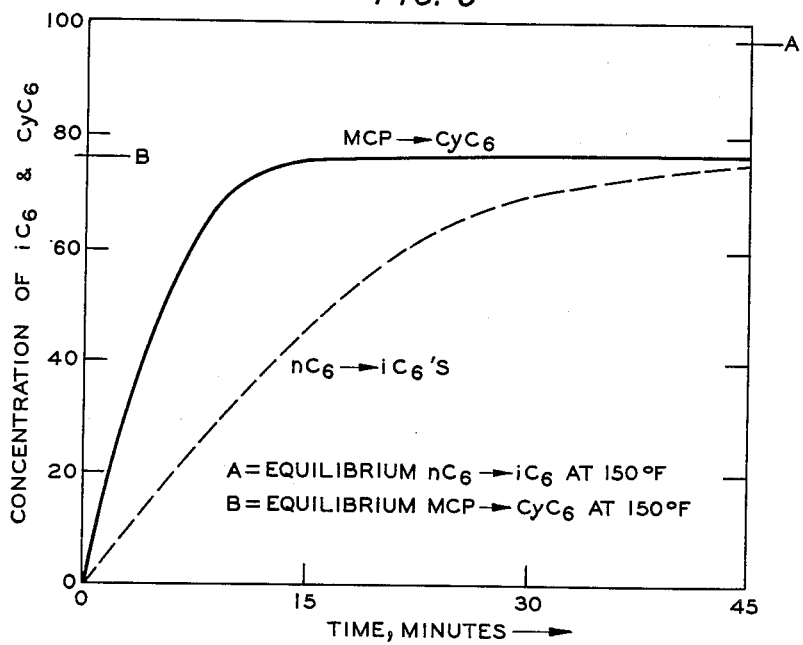

Referring now to the drawings, FIGURE 1 shows diagrammatically a two-reactor combination, according to the invention. FIGURE 2 shows graphically reactant concentrations at temperatures of 100 and 150° F. for the two-reactor system of the invention over periods of time up to 45 minutes. FIGURE 3 shows graphically reactant concentration at 100° F. for a single reactor system and FIGURE 4 shows reactant concentration at 150° F. for a single reactor system.

Referring now to FIGURE 1, a feed containing 40 percent methylcyclopentane and 60 percent of normal hexane, in a specific operation, is passed by 1 into 2 and from 2 to reactor 3 wherein the high temperature reaction is effected in the presence of the isomerization catalyst which, in this instance, is hydrogen chloride activated aluminum chloride catalyst, which is well known in the art. Other catalysts can be used also. The temperature in reactor 3 is 150° F. and the reaction time allowed by virtue of the size of the reactor and pumping rate is 30 minutes. Converted stream is removed from reactor 3 by pipe 4, passed through cooler 5 and through pipe 6 into reactor 7 which, in this embodiment, is operated at 100° F. and is of a size to provide only 15 minutes residence time. Thus, it will be noted that a much smaller recator 7 can be used than is used for reactor 3. From reactor 7, the effluent passes by pipe 8 to settler 9 from which hydrocarbons are removed overhead by pipe 10 for further processing, as known in the art. Catalyst complex is recovered by pipe 11 and pumped by pump 12 and pipe 13 to pipe 2. Hydrogen chloride activator is added as desired and as known in the art by pipe 14.

Charging stocks other than that described in connection with the figure can be used. However, essentially the charging stock will contain a substantial quantity of methylcyclopentane and normal hexane for reasons which are apparent to one skilled in the art. Additional feed components can comprise isohexanes, cyclohexane, pentanes, etc., the advantages of my invention being realized with such other feeds.

It will be noted that, in the embodiment described in FIGURE 1 of the drawing, the catalyst passes out from reactor 3 into reactor 7 and from reactor 7 to settler 9 and from the settler is recycled to reactor 3. Thus, in this embodiment, in which the catalyst is comprised in the effluent from reactor 7, it is advantageous to have the lower temperature of reactor 7 so that more catalyst will settle out in settler 9, less catalyst (aluminum chloride) being dissolved and lost from the process in the hydrocarbon at the lower temperatures. (Solubility of AlCl₃ in hydrocarbons at 150° F. is greater than 1,000 parts per million, and at 100° F. is about 300 parts per million.)

It is also to be noted that when operating in the conventional temperature range of, e.g., 140° F. reactor temperature outlet, using a single reactor, refrigeration of the feed is required to maintain this temperature (60° F. temperature rise across the reactor), whereas with the two reactor systems of the invention, the temperature of the first reactor can be allowed to go higher, e.g., 150 to 160° F., and subsequent cooling to about 100° F. can be done with water, thus eliminating the need of expensive refrigeration used in conventional operations.

When using hydrogen chloride activated aluminum chloride catalyst for conversion of methylcyclopentane and normal hexane to cyclohexane and isohexanes, respectively, the first reaction zone (zone 3) can be operated in a temperature range of 120 to 190° F., and the second reaction zone (zone 7) can be operated in a temperature range of 50 to 140° F., the latter zone always being at the lower temperature. Residence times can be adjusted as desired to produce the desired optimum conversions. Such times of reaction, depending on the temperatures employed, range from about 3 to 50 minutes, the first reaction zone always having the longer residence time.

The invention is applicable to stationary and also moving catalyst systems, and is applicable to other isomerization catalyst such as the noble metal containing catalyst, and other known conventional catalyst. The isomerization process of my invention may be carried out in the presence of hydrogen.

It is to be understood that another advantage of this invention is that catalyst and HCl concentrations in the reaction mixture can be varied between reactors to reach optimum concentrations for each zone. Injection of a portion of recycle catalyst and HCl between reactors will increase concentrations in the secondary reactor. The addition of an intermediate settler and catalyst recycle system would allow higher concentrations in primary reactor.

Reasonable variation and modification are possible within the scope of the foregoing disclosure, the drawings, and the appended claims to the invention the essence of which is that methylcyclopentane and normal hexane are isomerized in a two-stage treatment wherein, in the first stage, a high temperature is employed and wherein, in the second stage, a lower temperature and shorter residence time is employed, the operation being characterized in that there can be employed in the high temperature stage a higher than ordinary temperature for a time which is shorter than the total time used in conventional operations and that the remainder of the conventional time which has not been used in the first stage is utilized in the second stage at the lower temperature to obtain better all around yields.

I claim:

1. A method for the isomerization of a stream of hydrocarbons consisting essentially of methylcyclopentane and normal hexane to produce optimum yields of cyclohexane and isohexanes therefrom which comprises conducting the isomerizations at a temperature in the range of about 50° F. to about 200° F. in the presence of an isomerization catalyst effective in said range in two zones; in a first zone, isomerizing the entire stream at a relatively high temperature and relatively longer reaction time than in a second zone and in a second zone subjecting the once isomerized stream thus obtained at a lower temperature and for a substantially shorter period of reaction time.

2. A process for the isomerization of a mixture comprising methylcyclopentane and normal hexane to cyclohexane and isohexanes, respectively, which comprises, in a first reaction zone in the presence of an isomerization catalyst effective in the range of approximately 100 to approximately 150° F., isomerizing methylcyclopentane and hexane at a temperature of approximately 150° F. for a reaction time of approximately 30 minutes and then, in a second zone, isomerizing the once isomerized stream at a temperature of approximately 100° F. and for a reaction time of approximately 15 minutes and then recovering converted hydrocarbons from the reaction mass.

3. A method of a mixture comprising isomerizing methylcyclopentane and normal hexane which comprises admixing the same with an activated aluminum chloride catalyst and subjecting the mixture thus obtained in a first reaction zone to a temperature in the neighborhood of 150° F. for a time of reaction in the neighborhood of approximately 30 minutes, cooling the reaction mass thus obtained and then further subjecting the said mass in a second zone to a temperature in the neighborhood of 100° F. for a time in the neighborhood of approximately 15 minutes and then recovering converted hydrocarbons from the reaction mass.

References Cited in the file of this patent

UNITED STATES PATENTS 2,386,784   Fragen ---------------- Oct. 16, 1945